Dec. 28, 1948.	F. E. SHENE	2,457,501
ANIMAL TRAP
Filed Oct. 26, 1946	2 Sheets-Sheet 1
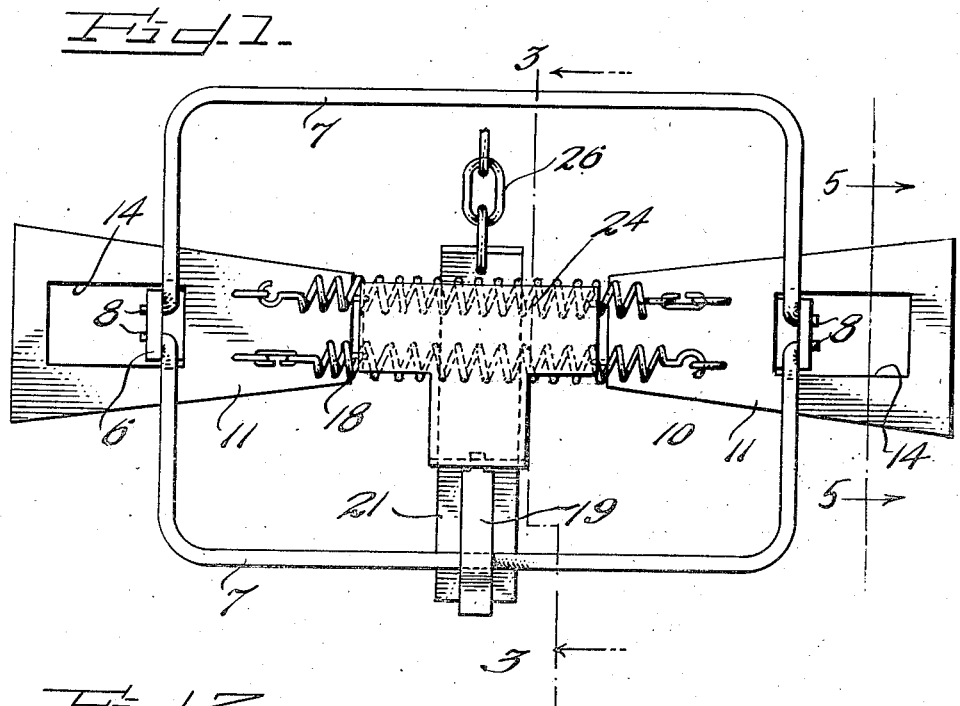
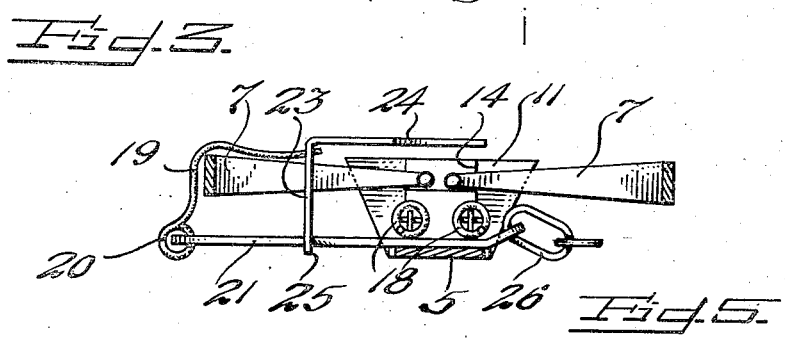
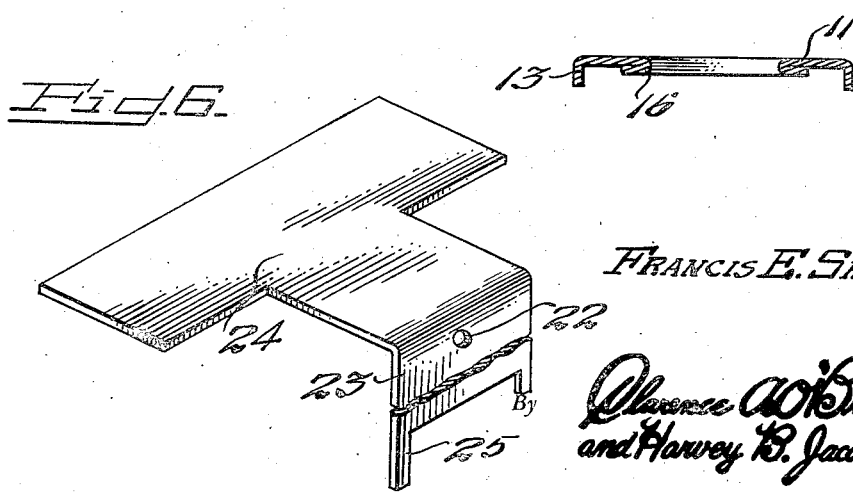
Inventor
FRANCIS E. SHENE.
By Clarence A. O'Brien
and Harvey B. Jacobson
Attorneys Dec. 28, 1948.  F. E. SHENE  2,457,501
ANIMAL TRAP
Filed Oct. 26, 1946  2 Sheets-Sheet 2
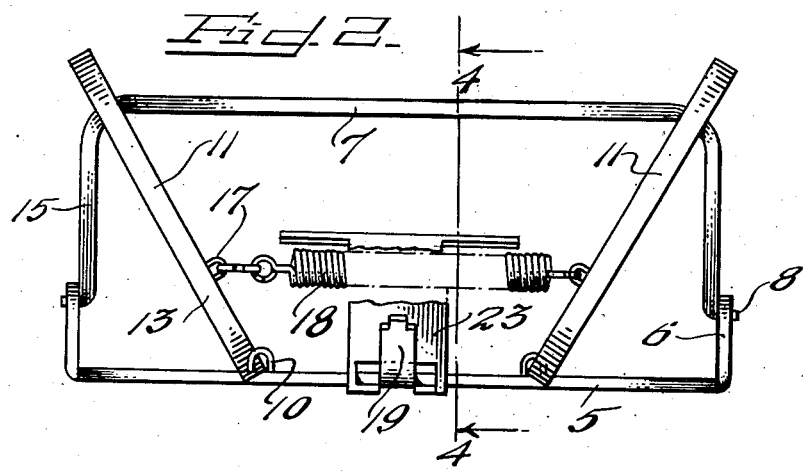
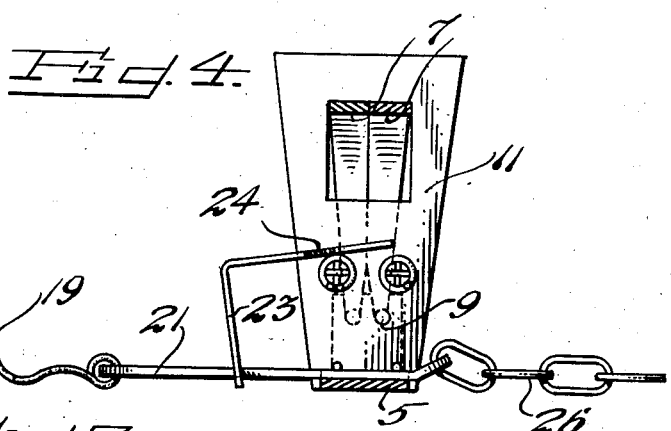
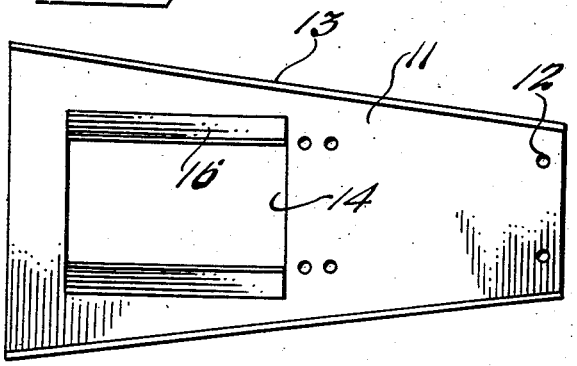
Inventor
FRANCIS E. SHENE.
By *Clarence A. O'Brien
and Harvey B. Jacobson*
Attorneys Patented Dec. 28, 1948

2,457,501

UNITED STATES PATENT OFFICE 2,457,501

ANIMAL TRAP

Francis E. Shene, Vermontville, N. Y.

Application October 26, 1946, Serial No. 705,845

5 Claims. (Cl. 43—88)

The present invention relates to new and useful improvements in animal traps and more particularly to a trap of the pivoted jaw type.

An important object of the present invention is to provide a trap of this character of simplified construction whereby to reduce the cost of manufacture thereof and at the same time to provide a trap which is strong and durable, efficient and reliable in operation and otherwise well adapted for the purposes for which the same is intended.

Another object is to provide a bait pan of relatively large area whereby the trap may be sprung more easily by the approach of an animal to the bait.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view showing the trap in set position.

Figure 2 is a side elevational view showing the trap in sprung position.

Figure 3 is a transverse sectional view taken on a line 3—3 of Figure 1.

Figure 4 is a similar view taken on a line 4—4 of Figure 2.

Figure 5 is a transverse sectional view of one of the jaw closing arms taken on a line 5—5 of Figure 1.

Figure 6 is an enlarged perspective view of the bait pan, and

Figure 7 is a bottom plan view of one of the jaw closing arms.

Referring now to the drawings in detail wherein for the purpose of illustration I have disclosed a preferred embodiment of the invention the numeral 5 designates an elongated base of strap metal having its ends bent upwardly into a perpendicular position to provide a pair of upstanding supports 6.

A pair of U-shaped jaws 7 have their ends bent outwardly as shown at 8 and are pivotally mounted in openings 9 in the supports 6 to provide for the vertical swinging movement of the jaws. The jaws 7 are likewise constructed of strap metal and are arranged so that the inner edges of the intermediate portion of the jaws will be moved into contact throughout the length of the bight portion of the jaws when in closed position to tightly grip an animal therebetween.

Pairs of eyes 10 are secured to the upper surface of the base 5 in any suitable manner, the eyes being positioned outwardly from the center of the base toward each end thereof and to each pair of eyes is pivotally connected one end of a jaw closing arm 11 by means of openings 12 formed in the arm.

The arms 11 are constructed of sheet metal with their side edges bent angularly to form downwardly extending flanges 13 positioned outwardly at the side of the base 5 and the side edges of the arms are flared toward their outer ends as shown more clearly in Figure 7 of the drawings.

A substantially rectangular shaped opening 14 is formed in the arms 11 adjacent its outer end and in which the leg portions 15 of the U-shaped jaws 7 are received. The side edges of the opening 14 are rolled as shown at 16 to provide a rounded contacting edge for the jaws whereby to facilitate sliding of the arms upwardly along the legs 15 of the jaws in a manner to close the jaws.

A pair of eyes 17 are secured to the opposed faces of the arms 11 in any suitable manner, the eyes being positioned outwardly from the inner pivoted ends of the arms and to which are connected the ends of a pair of contractible coil springs 18, the coil springs being arranged in parallelism and connected at their ends to the pair of arms 11 whereby to swing the arms upwardly in a manner to close the jaws.

The jaws 7 are secured in an open or set position by means of a trip arm 19 having one end rolled to form an eye 20 which is pivoted in the outer end of a laterally extending plate 21 welded or otherwise secured on top of the base 5. The free end of the trip arm 19 is curved inwardly to overlie one of the jaws 7 and has its end inserted in an opening 22 formed in the downwardly extending leg 23 of a bait pan 24. The side edges of the leg 23 of the bait pan are formed with extensions 25 which are bent under the side edges of the plate 21, the extensions 25 providing a loose sliding connection of the leg 23 with the plate 21 to adjust the bait pan laterally with respect to the trap and also provide limited pivotal movement for the bait pan.

The bait pan is of elongated substantially rectangular shape and overlies the springs 18 and with the ends of the bait pan terminating adjacent the pivoted ends of the arms 11 as shown to advantage in Figure 1 of the drawings.

To the inner end of the plate 21 is secured a chain 26 by means of which the trap may be staked to the ground.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. An animal trap comprising a U-shaped base, a pair of inverted U-shaped jaws pivoted at their ends to the upper ends of said base for vertical swinging movement into and out of closed position, a pair of plates pivoted at one end to said base for vertical swinging movement and engaging the sides of the jaws to close the jaws upon an upward movement of said plates, a trip releasably holding the jaws in an open set position, and a coil spring connecting the plates and operable to raise the latter.

2. An animal trap comprising a U-shaped base, a pair of inverted U-shaped jaws pivoted at their ends to the upper ends of said base for vertical swinging movement into and out of closed position, a pair of lifting arms pivoted at one end to the base and engaging the jaws adjacent their ends to close the jaws upon an upward movement of the arms, a retractible coil spring connected at its ends to said arms to raise the arms, and a trip releasably holding the jaws in an open set position.

3. An animal trap comprising a U-shaped base, a pair of inverted U-shaped jaws pivoted at their ends to the upper ends of said base for vertical swinging movement into and out of closed position, a pair of lifting arms pivoted at one end to the base and having an opening working along the end portion of the jaws to close the jaws upon an upward movement of the arms, a retractible coil spring connected at its ends to said arms to raise the arms, and a trip releasably holding the jaws in an open set position.

4. An animal trap comprising a U-shaped base, a pair of inverted U-shaped jaws pivoted at their ends to the upper ends of said base for vertical swinging movement into and out of closed position, a pair of lifting arms pivoted at one end to the base and having an opening working along the end portions of the jaws to close the jaws upon an upward movement of the arms, said opening having rolled edges to reduce friction with the jaws, a retractible coil spring connected at its ends to said arms to raise the arms, and a trip releasably holding the jaws in an open set position.

5. An animal trap comprising a U-shaped base, a pair of inverted U-shaped jaws pivoted at their ends to the upper ends of said base for vertical swinging movement into and out of closed position, a pair of lifting arms pivoted at one end to the base and having an opening working along the end portions of the jaws to close the jaws upon an upward movement of the arms, a pair of retractible coil springs connecting the arms and arranged for raising the arms, a lateral plate projecting from one side of the base, a bait pan mounted on the lateral plate for lateral adjustment, said pan overlying the springs, and a trip arm pivoted to the lateral plate and engaging the bait pan for holding the jaws in an open set position.

FRANCIS E. SHENE.

REFERENCES CITED

The following references are of record in the file of this patent:

UNITED STATES PATENTS

| Number | Name | Date |
| --- | --- | --- |
| 351,807 | Skinner | Nov. 2, 1886 |
| 1,296,407 | Layton | Mar. 4, 1919 |
| 1,893,974 | Zook | Jan. 10, 1933 |